United States Patent [19]
Flemings et al.

[11] Patent Number: 4,572,818
[45] Date of Patent: Feb. 25, 1986

[54] PROCESS FOR PURIFYING METAL COMPOSITIONS

[75] Inventors: Merton C. Flemings, Cambridge, Mass.; Andrew L. Lux, Creve, Mo.

[73] Assignee: Massachusetts Institute of Technology, Cambridge, Mass.

[21] Appl. No.: 590,407

[22] Filed: Mar. 16, 1984

Related U.S. Application Data

[63] Continuation of Ser. No. 507,903, Jun. 27, 1983, abandoned, which is a continuation of Ser. No. 247,500, Mar. 25, 1981, abandoned, which is a continuation-in-part of Ser. No. 884,457, Mar. 8, 1978, abandoned, which is a continuation-in-part of Ser. No. 876,591, Feb. 10, 1978, abandoned, which is a continuation-in-part of Ser. No. 760,875, Jan. 21, 1977, abandoned.

[51] Int. Cl.$^4$ .................. C22C 1/00; C22C 33/00
[52] U.S. Cl. ............................ 420/590; 75/63; 75/129; 148/1
[58] Field of Search ............. 420/590; 75/129.63, 75/130 R, 130.5 R, 132; 148/1, 3

[56] References Cited

U.S. PATENT DOCUMENTS 3,677,742  7/1972  Toth ............................. 75/68 B
4,295,896  10/1981  Flemings et al. .................. 148/1

FOREIGN PATENT DOCUMENTS 508925  7/1939  United Kingdom ............... 75/63

Primary Examiner—Christopher W. Brody
Attorney, Agent, or Firm—James E. Maslow; Paul J. Cook

[57] ABSTRACT

Purified metal compositions and metal compositions free of secondary phase material are produced by heating a metal alloy from the nonequilibrium solidus temperature while subjecting the liquid-solid mixture to high pressure and forcing the liquid through a filter. Compositions obtained by the process of this invention have a nondendritic structure which can be substantially free of secondary phase material.

7 Claims, 7 Drawing Figures

FRACTION SOLID VERSUS TEMPERATURE FOR Sn-15% Pb ALLOY, k = 0.1.

PROCESS FOR PURIFYING METAL COMPOSITIONS

The Government has rights in this invention pursuant to Contract No. DAAG-29-77-C-0023 awarded by the Department of the Army.

REFERENCE TO RELATED APPLICATIONS

This application is a continuation of application Ser. No. 507,903, filed June 27, 1983, now abandoned, which in turn is a continuation of Ser. No. 247,500 filed Mar. 25, 1981, now abandoned, which in turn is a continuation-in-part of application Ser. No. 884,457 filed Mar. 8, 1978 now abandoned which in turn is a continuation-in-part of application Ser. No. 876,591, filed Feb. 10, 1978 now abandoned, which in turn is a continuation-in-part of Ser. No. 760,875, filed Jan. 21, 1977 now abandoned.

BACKGROUND OF THE INVENTION

This invention relates to purified metal compositions, to novel metal compositions free of secondary phase material and to a method for making the metal compositions. More particularly, this invention relates to a process for making such compositions wherein a portion of the metal sample is removed as a liquid during heating at elevated temperature and pressure.

Fractional crystallization as a means for purifying metal alloys is well known. The available purification procedures are based upon the fact that when an alloy which solidifies over a temperature range is taken to a temperature within its liquid-solid range, the solid phase has a composition different from the liquid phase. The average composition of both the liquid and solid portions of the metal alloy also depends upon the temperature of the liquid-solid mixture. By controlling the temperature of the system, the impurity to be removed can be isolated in either the solid or liquid phase. Thereafter, the solid and liquid phases are separated by physical means and the pure fraction is recovered.

A wide variety of physical separation means have been proposed which, combined with fractional crystallization, are designed to recover pure metal alloys or metals. For example, centrifugal filtration has been proposed wherein the liquid-solid mixture is subjected to centrifugal forces up to about 2,500 g and the liquid under this force is passed through a filter comprising all or a portion of the wall of the container housing the composition or comprising the solid metal composition itself, as disclosed in U.S. Pat. No. 3,374,089 to Robinson et al, issued Mar. 19, 1968. Alternatively, centrifugal sedimentation has been proposed. In this process, the liquid-solid mixture also is subjected to centrifugal forces to cause the solid phase to accumulate on the interior wall of the container housing the mixture and the liquid phase to accumulate within the central portion of the container. The liquid then is recovered selectively, such as by decantation. Also, the process disclosed in U.S. Pat. No. 3,211,547 to Jarrett et al, issued Oct. 12, 1965 includes a step of forming crystals on the top surface of a liquid-solid aluminum composition allowing the crystals to settle and then compressing up to one-half of the surface area with tampers. The liquid then is recovered. Also, it has been proposed in British Pat. No. 508,925 to heat a metal alloy to form a liquid-solid mixture and then subject the mixture to a pressure of at least 500 atmosphere in order to force the liquid through a filter to leave a solid.

While these processes are capable of increasing the purity of metal compositions, they are undesirable in that a substantial portion of the liquid remains unseparated from the solid and the "efficiency" of the process is low, i.e., that often the separation process must be repeated a number of times to obtain the desired purification. The process provided herein overcomes these objections and provides efficient, economical means of purifying metal.

All cast alloys posses significant dendritic microsegregation after solidification. The secondary phase that results from "non-equilibrium" solidification limits the alloys that can be practically cast and worked, and the properties of alloys that are cast. For example, significant increases in strength of 7000 series aluminum alloys could be achieved by increasing the alloy content above that of 7075 alloy or its newer modifications. However, when such increases are made in ingots, the amount of eutectic increases to a point that ingot-working is difficult or impossible, ingot cracking is a problem, and the eutectic is not fully solutionized with practically obtainable cycles. Thus, methods such as atomization and thin plate casting have been employed to obtain a fine enough particle size so that solutionization can be obtained before extensive working. Secondary phases are well known to limit the mechanical properties of ferrous and superalloys, examples being the sulfides in steel and the alloy eutectic in $\gamma'$ strengthened superalloys. If these alloys could be produced with a structure exactly like that now achieved, but without precipitation of this secondary phase at the end of solidification, significant increases in room temperature and elevated temperature properties could be obtained.

SUMMARY OF THE INVENTION

This invention is based upon the discovery that a remarkably efficient metal purification process results when metal alloys are heated within the liquid-solid region while being held under pressure to force the liquid being formed through a filter. The heating step causes sufficient melting to maintain open channels between the dendrite arms so that interdendritic liquid can be separated completely from the solid under moderate pressure. The resultant solid composition comprises a nondendritic structure which can be free of secondary phase material. The final composition also can have a fine grain structure. The process of this invention also is useful for processing nondendritic metal compositions such as wrought metal compositions. The process provided herein is capable of completely removing the liquid which would otherwise solidify to form secondary phases, and fully compresses the remaining solid, so that when the liquid forming the secondary phase is substantially completely removed, the result is a fully dense, homogeneous solid without second phases, and therefore with greatly improved properties such as strength over the properties of presently available alloys.

DESCRIPTION OF SPECIFIC EMBODIMENTS

Figure 1:
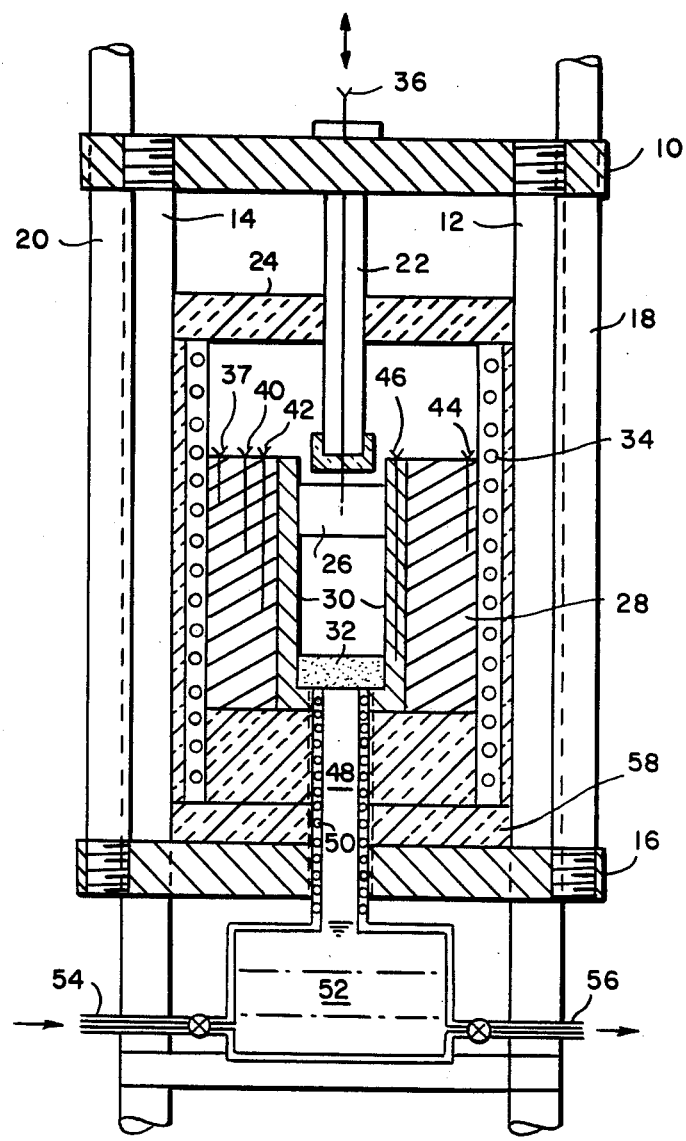
FIG. 1 is a cross-sectional side view of an apparatus used to conduct the process of this invention.

In accordance with this invention, a metal composition is taken to a temperature at or near the nonequilibrium solidus temperature (where melting begins on heating). During heating, the composition is subjected to a superatmospheric pressure to effect separation of the solid phase from the liquid phase. It is very important to apply pressure at and above non-equilibrium solidus temperature, but it is acceptable to apply it earlier provided that it does not cause "plugging" of the filter means. The pressurized heated composition is gradually increased in temperature to a temperature causing additional liquid to form and maintaining open channels between the dendrite arms so that the interdendritic liquid can be separated completely even when utilizing moderate pressure. The pressure utilized during this simultaneous heating and pressing operation is sufficient to overcome the inherent strength of the dendritic solid, to convert the dendrites to a fine-grain structure and is sufficient to cause the liquid to flow through and out of the solid. The pressures needed depend upon the ratio of solid to liquid, and the inherent strength of the solid dendritic structure. Generally, the pressure is greater than about 500 psi and generally between about 2000 and 10,000 psi. The phrase "separation efficiency" used herein is defined as the percentage of liquid formed that is recovered from the solid. Separation efficiency is typically in excess of 75 percent. Separation can be effected either in a closed container wherein liquid is forced through a filter having a pore size sufficiently small to selectively retain the solid or can be conducted between two surfaces open at the sides to force the liquid selectively out the open sides or through at least one of the surfaces which functions as a filter. After separation of liquid from solid, the solid can be removed from pressure and cooled quickly or slowly to room temperature to regulate the microstructure of the solid as desired. Alternatively, cooling can be conducted while the solid is under pressure.

The process of this invention is capable of improving the purity of an alloy which melts over a temperature range by virtue of the removal of liquid which can form secondary phase material. The process has the capacity for producing metal alloy compositions which are virtually 100% free of secondary phase material in contrast to prior art processes which are not capable of producing alloy compositions substantially free of secondary phase materials. While the process of this invention has the capability of producing highly purified metal alloy compositions, its usefulness is not limited to such applications. In fact, the process is useful and valuable when it is desired to remove even a small portion of the components which form secondary phase material. For example in certain instances such as when forming aluminum ingots by present commercial processes, it may be advantageous to remove even a small proportion of the material capable of forming secondary phases even though such ingots are better than 99% pure. Furthermore, in many instances, it is desirable to leave components which form secondary phase in the alloy composition since such components can be dissolved in the primary phase to form a solid solution having improved mechanical properties. In any event, the process of this invention is less expensive to operate as compared with presently available purification processes, is more efficient in that it permits obtaining a greater amount of purified solid and it is capable of producing an alloy substantially 100% free of secondary phase.

In a surprising aspect of this invention, it has been found that the yield of solid purified metal is surprisingly high. For example, the yield of purified solid in the process of this invention can be as high as about 5 times greater than the isothermal process.

The novel purified solid metal composition that can be obtained by the process of this invention differs from normal dendrite structures, in that the grain structure is refined, porosity is low or absent and second phases are virtually totally absent. Additional benefits can accrue from these structural differences. As used herein, the term "secondary phase" means a second usually crystalline phase which forms late in solidification in conventional processes and which includes intermetallics and oxides. The products obtained by this invention which are free of secondary phases are capable of being of much higher concentration of the solute portion of the alloy than is possible in conventional solidification. Thus, the new compositions of this invention possess as nearly as desired the desired maximum equilibrium solute content of at least about 80%. Furthermore, the new compositions of this invention can be obtained in much larger sizes of at least about ⅛ inch thick as compared with prior art processes for obtaining secondary phase-free compositions such as splat cooling. Thus, the compositions of this invention can be worked such as by pressing or forging or can be utilized as cast.

Any metal alloy system regardless of its chemical composition can be employed in the process of this invention, except that pure metals or alloys that melt at a single temperature cannot be employed. Representative suitable alloys include magnesium alloys, zinc alloys, aluminum alloys, copper alloys, iron alloys, nickel alloys, cobalt alloys and lead alloys such as lead-tin alloys, zinc-aluminum alloys, zinc-copper alloys, magnesium-aluminum alloys, magnesium-aluminum-zinc alloys, magnesium-zinc alloys, aluminum-copper alloys, aluminum-silicon alloys, aluminum-copper-zinc-magnesium alloys, copper-tin bronzes, brass, aluminum bronzes, steels, cast irons, tool steels, stainless steels, superalloys such as nickel-iron alloys, nickel-iron-cobalt-chronium alloys, and cobalt-chromium alloys, or nearly pure metals such as iron, copper, or aluminum which nearly pure metals it is desired to refine more fully.

Referring to FIG. 1, the apparatus includes an upper compression plate 10 supported by rods 12 and 14 and a lower compression plate 16 supported on rods 18 and 20. Rods 18 and 20 are slidably mounted through plate 10 and rods 12 and 14 are slidably mounted through plate 16. A plunger rod 22 is supported on plate 10, extends through insulation wall 24 and is positioned to contact plunger 26 when in use. A brass cylinder 28 is provided with an opening to house a crucible 30 to contain the liquid-solid sample. The bottom of the crucible 30 is provided with a filter 32 such as porous alumina. A resistance heating furnace 34 surrounds the cylinder 28. Thermocouple 36 is provided in plunger 22 and thermocouples 37, 40, 42, and 44 are provided in cylinder 28. A thermocouple 46 also is provided in crucible 30. A quench channel 48 including a heating coil 50 is provided below the filter 32. The quench channel 48 is connected to the quench chamber 52 which is provided with a liquid inlet 54 and a liquid outlet 56. An insulation plate 58 is located below the furnace-crucible arrangement.

In operation, the sample is placed in crucible 30 and heating coil 34 is activated so that the sample, crucible 30, cylinder 28 and plunger 34 are taken to the temperature at which separation is desired as determined by the thermocouples 36, 37, 40, 42, 44, and 46. During heating, pressure is generated by the upper plate 10 and plunger rod 22 which is transferred to the plunger 26 and to the sample. The liquid phase, under pressure, passes through the filter 32, quench channel 48 and into quench chamber 52. The solid phase is retained in the crucible 30 by filter 32. In the second step, the metal retained in crucible 30 is partially melted to form open channels between the dendritic arms while the pressure is maintained or increased. The resultant solid composition is free of secondary phase material and comprises a fine-grain microstructure.

Figure 2:
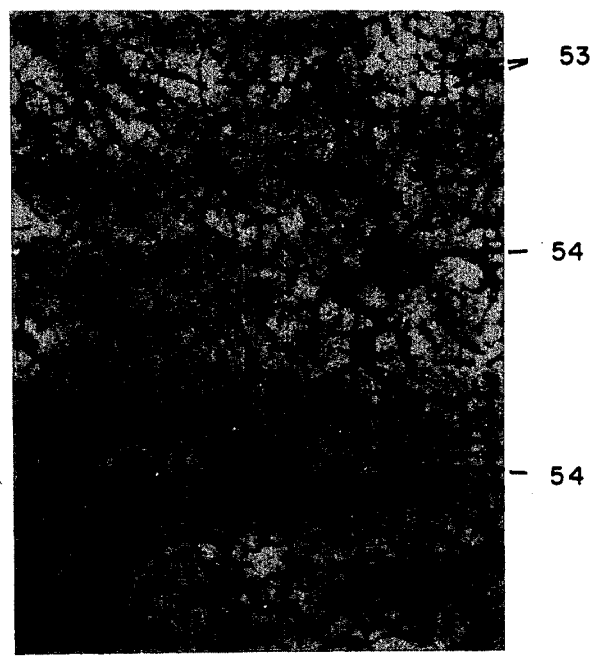
FIG. 2 is a photomicrograph of a cast tin-15% lead alloy not processed by this invention.

Referring to FIG. 2, the photomicrograph is taken at 130 times magnification. The tin-15% lead alloy comprises dendrites 53 shown in white surrounded by solid secondary phase material 54 shown in black.

Figure 3:
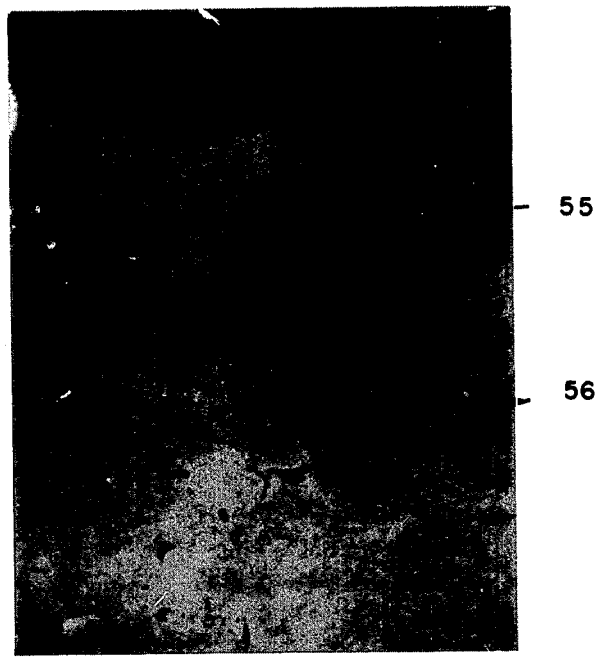
FIG. 3 is a photomicrograph of the alloy of FIG. 2 after the first step of this invention.

FIG. 3 shows the alloy of FIG. 2 after being heated to 193° C. which corresponds to 53% solid and being subjected to a pressure of 2853 psi in a one-step process. The final alloy comprises dendrites 55 shown in white and secondary phase material 56 shown in black. Approximately 95% of the secondary phase liquid was separated from the liquid-solid precursor to the alloy shown.

Figure 4:
FIG. 4 is a photomicrograph of the alloy of FIG. 2 free of secondary phase material obtained by the process of this invention.

FIG. 4 is a photomicrograph taken at 130 times magnification of the composition of this invention as derived from the composition shown in FIG. 2. The composition of FIG. 2 was just below the nonequilibrium solidus temperature (1° C. below 183° C.) and was then subjected to a pressure of 2853 psi, while it was continuously heated to 193° C. and then held at that temperature and pressure for about 1 minute. The resultant solid was cooled to room temperature and had the fine-grain microstructure free of any secondary phase material as shown. Thus, essentially 100% of the liquid formed during heating from 183° C. to 193° C. was separated from the solid by this process.

Figure 7:
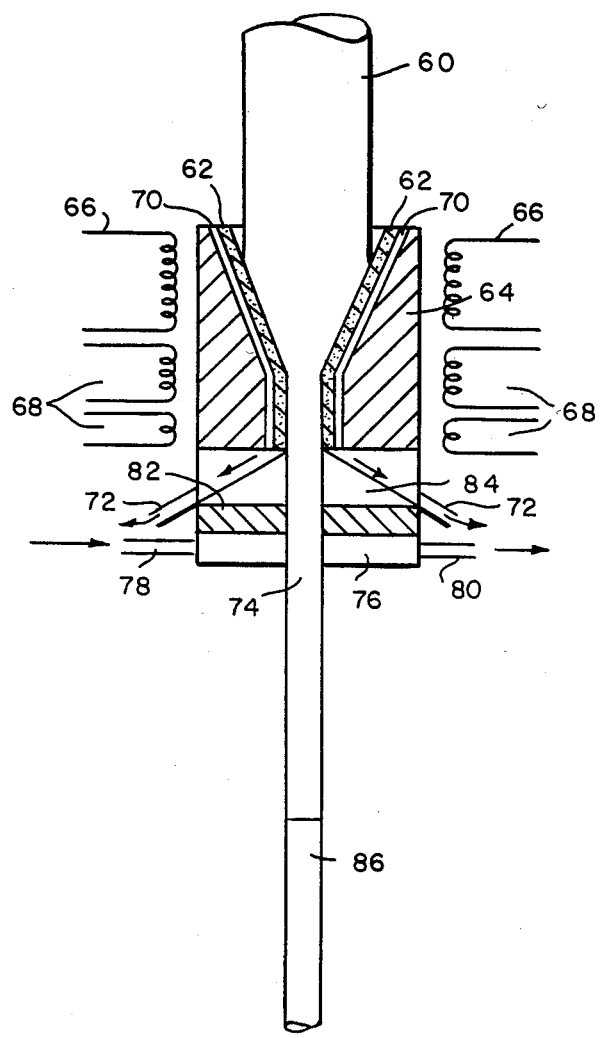
FIG. 7 is a cross-sectional side view of an apparatus used to conduct the process of this invention continuously.

Referring to FIG. 7, a feed bar 60 formed of a metal alloy is directed under pressure into contact with a porous inclined conical plate 62. The plate 62 is supported on a thermally conducting base 64. Heaters 66 are positioned near the top of the porous plate 62 in order to heat the metal to its nonequilibrium solids temperature and heaters 68 are positioned near the bottom of plate 62 to heat the metal alloy to the desired final temperature. The liquid formed is forced through plate 62 and is allowed to rush down a gap 70 between plate 62 and base 64 and is removed through parts 72. The refined solid 74 is passed through cooling disk 76 through which a cooling liquid such as water is passed in order to fully cool the bar and minimize undesirable creep. Cooling liquid enters disk 76 through conduit 78 and is removed through conduit 80. An insulation disk 82 is positioned between cooling disk 80 and base 84. Dummy bar 86 can be used in a conventional manner to initiate passage of the feed bar through the apparatus.

The process of this invention also can be utilized to purify any metal alloy or metal composition which melts over a temperature range within which the composition of the liquid and solid phases are temperature dependent. All that is necessary is that the temperature utilized be such that the impurity desired to be removed predominates in one of the two phases.

The following example illustrates the present invention and is not intended to limit the same.

EXAMPLE I

This example was conducted with cast tin-15% lead alloy having the microstructure shown in FIG. 2. The experiment was performed in the apparatus shown in FIG. 1. As set forth above, the apparatus includes a temperature controlled furnace, a stainless steel crucible for holding semisolid samples, the filter and a speed-controlled plunger to squeeze liquid through the filter.

The furnace was cylindrical and had 610 watt capacity resistance elements rated at 1210° C. A stainless steel crucible, 1 inch in diameter and 3 inches in length, was placed in the center of the furnace.

Temperature was virtually uniform and constant within the sample. Temperature gradients were eliminated by surrounding the sample and crucible with a heavy brass cylinder and adding a secondary heater around the quench channel. Several chromel-alumel thermocouples are positioned in the crucible wall and the brass cylinder. A thermocouple also runs down a central hole through the plunger-rod and into the plunger, itself, ending $\frac{1}{8}$ inch from the top of the sample. A test was performed only when it was ascertained that all thermocouples were reading within 0.5° C. of each other and all were constant with time. The alumina filter used in this experiment was ground to +0.001 inch less than the inside diameter of the crucible, was $\frac{1}{4}$ inch thick and had pores of an average size of 200 microns. It was positioned by first heating the crucible to 300° C. and then inserting the filter. This provides a tight fit with no leakage between the periphery of the filter and the crucible. The plunger is driven by a compression cage apparatus which fits into a Hounsfield tensometer. The tensometer is driven by a speed-controlled motor, and the plunger motion and force are recorded simultaneously during a test.

The load was measured by the deflection of a calibrated spring beam. The deflection of the spring beam is transmitted through a lever system to a piston which displaces mercury into a glass tube (mercury column). The movement of the mercury column is followed by manual pushing of a cursor which has an attached needle. This needle punctures the graph sheet at specified time intervals, thus recording the force. The graph sheet is attached to a drum which rotates as the driving gear mechanism of the tensometer rotates.

Samples of the dendritic Sn, 15% Pb were cast, cut to approximately 1$\frac{3}{4}$ inches in length, and machined in order to fit snugly in the crucible. External to the furnace, the sample was placed into the crucible and the plunger was positioned. This assembly was put into the furnace and then heated to the desired temperature. Heat-up rates were 10 and 100 and 100° C./hr. During heating to the desired terminal temperature, the plunger was driven downward so that a constant pressure of 2853 psi was maintained. At the maximum temperature, the experiment was ceased. In the contrasting example, the test sample was heated to 193° C. and then the plunger was driven at a constant speed until a maximum pressure of 2853 psi was reached. Plunger speeds were $10^{-3}$, $10^{-2}$ and $10^{-1}$ cm/sec. As the plunger moved downwards, liquid was forced through the filter and fell into the water quench. In some tests, when the maximum load was reached, the condition of constant plunger speed was stopped, and instead pressure was held constant for 10 minutes; then the test was stopped. In the process of this invention, after a substantial portion of the liquid was removed at 183° C. and the sample was further continuously heated to 193° C. while still under pressure and all of the liquid formed in the sample was removed from the sample.

At the conclusion of each experiment, the plunger was quickly withdrawn and the crucible and remaining alloy (cake) were removed from the furnace and quenched. Samples for metallography and chemical analyses were removed from both the cake and filtrate. The cake obtained by the isothermal procedure had the microstructure shown in FIG. 3. The cake obtained by the two-step procedure of this invention was free of secondary phase material and had the microstructure shown in FIG. 4.

Figure 5:
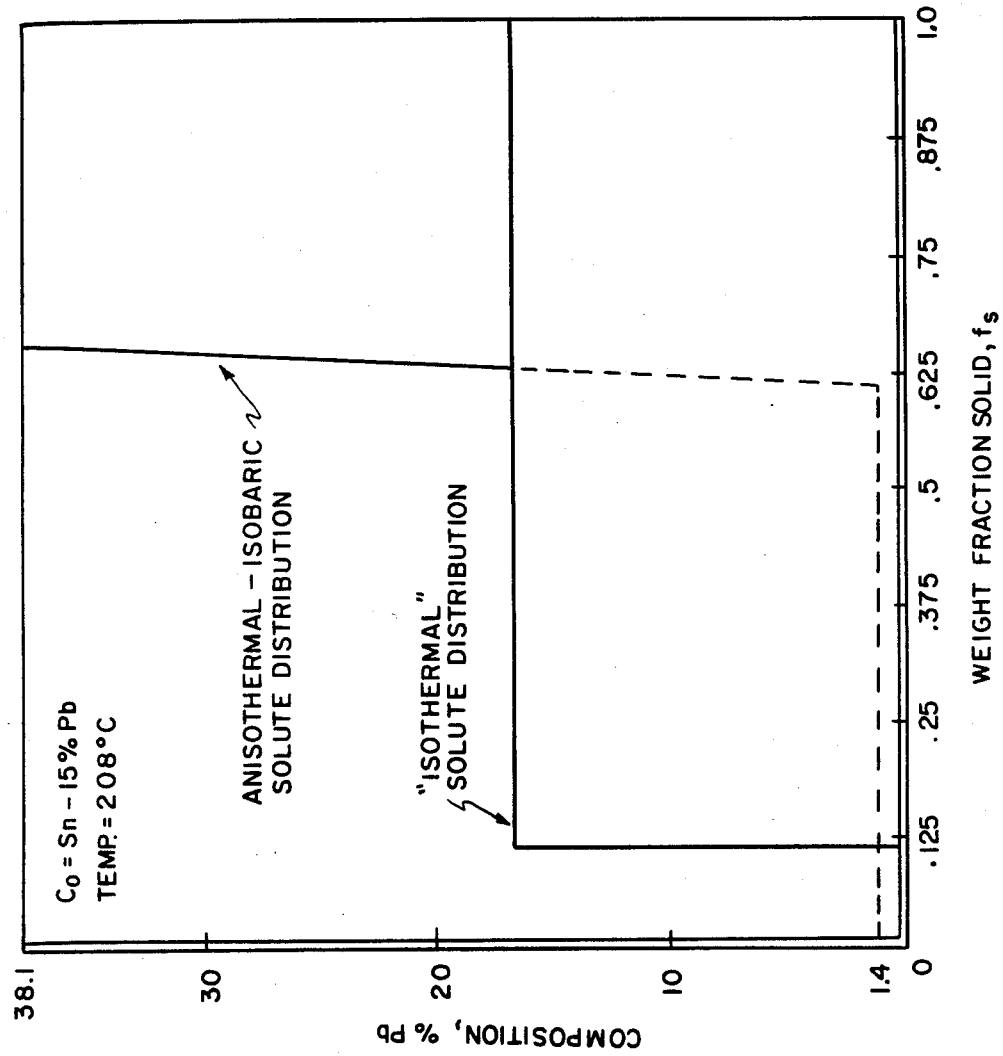
FIG. 5 is a graph illustrating the percent solid recovered as a function of alloy compositions for a given set of temperature and pressure conditions.
Figure 6:
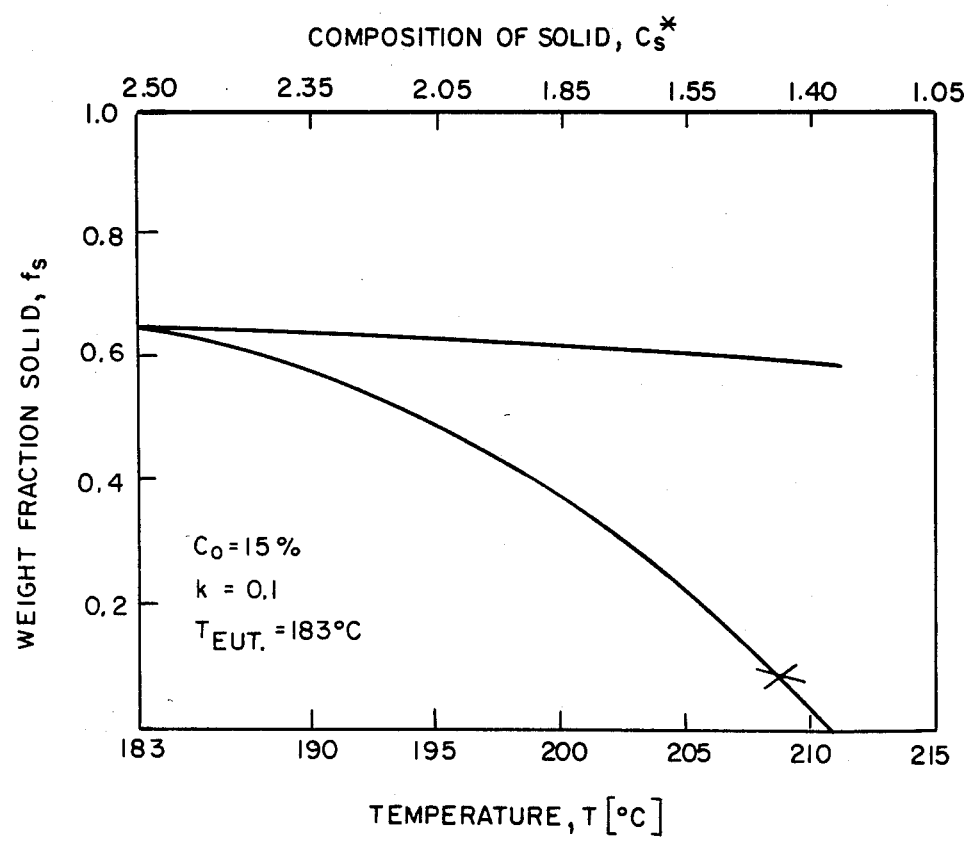
FIG. 6 is a graph illustrating the percent solid recovered by the process of this invention and the process of the prior art for the conditions utilized to obtain the graph of FIG. 5.

In addition to the runs set forth above, the samples in each process were subjected to a range of final temperatures as shown in FIG. 6. Surprisingly, as shown in FIGS. 5 and 6, the amount of solid recovered over a temperature range of 183° C. to 212° C. final temperature was essentially constant and was about 62.5%. In contrast, the amount of solid obtained from the isothermal process ranged from about 62.5% at 183° C. to a minimal about at 212° C.

What is claimed is:

1. A process for removing at least a portion of secondary phase material from a metal alloy comprising the steps of
   heating a metal alloy to a temperature not substantially less than its nonequilbrium solidus temperature to form a first liquid-solid composition;
   applying a superatmospheric pressure to said liquid-solid composition sufficient to overcome the inherent strength of the solid and sufficient to cause the first liquid in said composition to flow;
   separating the pressurized flow liquid from the pressurized solid remaining in said composition;
   increasing the temperature to partially melt the secondary phase between dendritic arms to form a solid phase and a second liquid phase;
   maintaining or increasing said pressure and said increased temperature on said remaining solid after said first liquid has been separated from said composition, thereby to separate said second liquid phase from said solid; and
   cooling said remaining solid as a substantially homogenous composition.

2. The process of claim 1 wherein said cooling includes maintaining pressure on said remaining solid as it cools.

3. The process of claim 1 wherein said metal alloy is passed continuously through a zone for said heating and said pressurization; and
   said first liquid and second liquid are continuously separated from said solid remaining in said zone.

4. The process of claim 1 wherein the pressure is above about 500 psi.

5. The process of claim 1 wherein the first liquid, and second liquid and solid are housed in a container and the first liquid and second liquid are forced under pressure through a filter to pass said first liquid and second liquid through said filter and to retain said solid in said container.

6. The process of claim 1 wherein greater than 75% of the first liquid and second liquid formed are separated from the solid.

7. The process of claim 1 wherein the pressure is between about 2000 and 10,000 psi.

* * * * *